United States Patent [19]
Nevin et al.

[11] Patent Number: 5,766,017
[45] Date of Patent: Jun. 16, 1998

[54] CLINICAL SIMULATION WORKSTATION

[75] Inventors: Robert L. Nevin, Orland Park; Denis M. Sexton, Lockport, both of Ill.

[73] Assignee: Nevin Laboratories, Inc., Chicago, Ill.

[21] Appl. No.: 730,128

[22] Filed: Oct. 15, 1996

[51] Int. Cl.⁶ .................................................. G09B 23/30
[52] U.S. Cl. .......................................... 434/263; 434/270
[58] Field of Search ................................ 434/263, 262, 434/270, 264; 433/77

[56] References Cited

U.S. PATENT DOCUMENTS

| | | | |
|---|---|---|---|
| 4,416,634 | 11/1983 | Beach | 434/263 |
| 5,013,240 | 5/1991 | Bailey et al. | 433/77 |
| 5,102,340 | 4/1992 | Berlinghoff et al. | 434/263 |
| 5,158,488 | 10/1992 | Berlinghoff et al. | 434/263 |
| 5,433,613 | 7/1995 | Berlinghoff | 434/263 |
| 5,480,307 | 1/1996 | Lang et al. | 434/263 |
| 5,536,084 | 7/1996 | Curtis et al. | 433/77 |

FOREIGN PATENT DOCUMENTS 4203957  8/1993  Germany.

*Primary Examiner*—Paul J. Hirsch
*Attorney, Agent, or Firm*—Knechtel, Demeur & Samlan

[57] ABSTRACT

A dental teaching and practicing simulator comprising a stationery work bench having a work surface and a completely enclosed storage compartment. The storage compartment has a door with locking means thereon to restrict access to the storage compartment. The dental simulation and teaching equipment is mounted on a slide mechanism which can be stored within the compartment and slid out therefrom for utilization. The dental simulation and teaching equipment comprises a mannequin head, a torso, handpieces, and vacuum tools which are normally used in dentistry. The dental simulation and teaching equipment can be stored and locked in the storage compartment such that access thereto is limited. Thus, a safe and secure environment is provided for the equipment until its authorized use.

20 Claims, 4 Drawing Sheets

CLINICAL SIMULATION WORKSTATION

BACKGROUND AND SUMMARY OF THE INVENTION

This invention relates to a dental teaching and practicing simulator such as the types generally used for education and training of dentists and hygienists.

In the past, there have been clinical simulation workstations used for dental teaching and practicing apparatus. For example, U.S. Pat. No. 5,102,340 entitled Dental Teaching and Practicing Apparatus illustrates a mannequin head and associated apparatus for teaching dental-clinical operating procedures all of which are mounted on a roller base. The height of the mannequin can be adjusted by means of a scissors linkage arrangement. However, a shortcoming of this device is that it does not provide for securely storing the mannequin head and associated apparatus within a secure cabinet. Furthermore, the torso of the mannequin head is not adjustable along a horizontal plane such that the torso can be tilted to various angles.

U.S. Pat. No. 5,158,488 entitled Combined Teaching and Practicing Apparatus illustrates a device similar to the device shown in the '340 patent except that the moveable device can be inserted into an open space provided in a stationery dental-technical teaching workbench. Although the torso can be placed under a work surface, there is not any means to secure the mannequin and associated apparatus so that access to it can only be accomplished by authorized persons.

A mannequin and associated instruments is illustrated in German Patent DE 42 03 957. Again, no provision is made to secure in a locked compartment the mannequin and associated instruments. Although this device does show a mannequin head having a pivoting mechanism, the mannequin torso still does not pivot.

Before dental students are permitted to treat patients in a clinic, they develop their skills by using mannequins under the supervision of their instructors. A properly designed clinical simulator should enable the student and instructor to place the mannequin and the treatment equipment in the same relative position that the patient and the equipment will be in on the clinic floor. The simulator should consist essentially of a mannequin head, a torso, and treatment equipment. The system should also include a dental light which illuminates the oral cavity. The light can either be a conventional intra-oral dental light or a less expensive fixed-focus high intensity halogen light. It is important that the student be able to position the mannequin and the treatment equipment in all of the appropriate positions for examination and treatment such as those that will be encountered in a real patient environment.

Because space is limited at most dental schools, the clinical simulation laboratory or workstation is also used to perform conventional dental laboratory procedures. Among the laboratory procedures students are expected to learn are trimming dies and preparation of custom trays. Many of the laboratory procedures include grinding with a laboratory handpiece all of which generates dust. This dust is captured by a dust collector built into the work station. The dust collector can either be a central system in which one motor provides suction at several work stations or a system in which each work station has its own small dust collector.

A problem exists with the prior art devices. Most preclinical laboratories at dental schools are available for the students to use late into the evening. This leaves the teaching equipment open for damage or theft. For example, the tubing for the handpieces, other equipment, and the mannequin are left exposed in the prior art devices. These become subject to damage by floor cleaning equipment and possibly even theft.

Thus, it is an object of the present invention to provide a clinical simulation station in which dental simulation and teaching equipment can be completely stored and locked in a cabinet when not in use. The cabinet is secure within the work bench and protects the equipment, including the mannequin and dental simulation equipment, from either theft or damage.

Related to this object is the object of providing a dental teaching and practicing simulator which is adapted for either a right-handed or a left-handed student.

Another object is the object of providing a dental teaching and practicing simulator in which the equipment is mounted on a slide mechanism which can easily be pulled out from the cabinet for use. Yet, another object is the object of providing a mannequin and related equipment which is adjustable in its orientation so that it can simulate an actual patient situation.

Still, another object is the object of providing a dental teaching and practicing simulator which is adapted to receive mannequins and torsos of various manufacturers.

Still, another object is the object of providing a dental teaching and practicing simulator which has a stationery workbench which incorporates a dust-collecting system which operates in conjunction with electric handpieces used for grinding procedures.

The foregoing objects and advantages are achieved in Applicant's invention. Applicant's invention provides a dental teaching and practicing simulator which has a stationery workbench having a work surface. There is a completely enclosed storage compartment provided as a part of the workbench. It has a lockable door which provides access to the compartment only by authorized personnel. Within the compartment is a slide mechanism on which is mounted the dental simulation and teaching equipment. Generally, the equipment is comprised of a mannequin head, a torso, a handpiece control arm, a handpiece control unit with selected handpieces, a vacuum tools arm with vacuum tools mounted thereon, and a water supply system. In this manner, the dental simulation and teaching equipment can be stored and locked in the storage compartment. It can be opened by authorized personnel allowing the equipment to be slid out and adjusted for use.

Other objects and advantages will be apparent upon reviewing the description of the drawings and detailed description of the preferred embodiment.

DESCRIPTION OF THE PREFERRED EMBODIMENT

Figure 1:
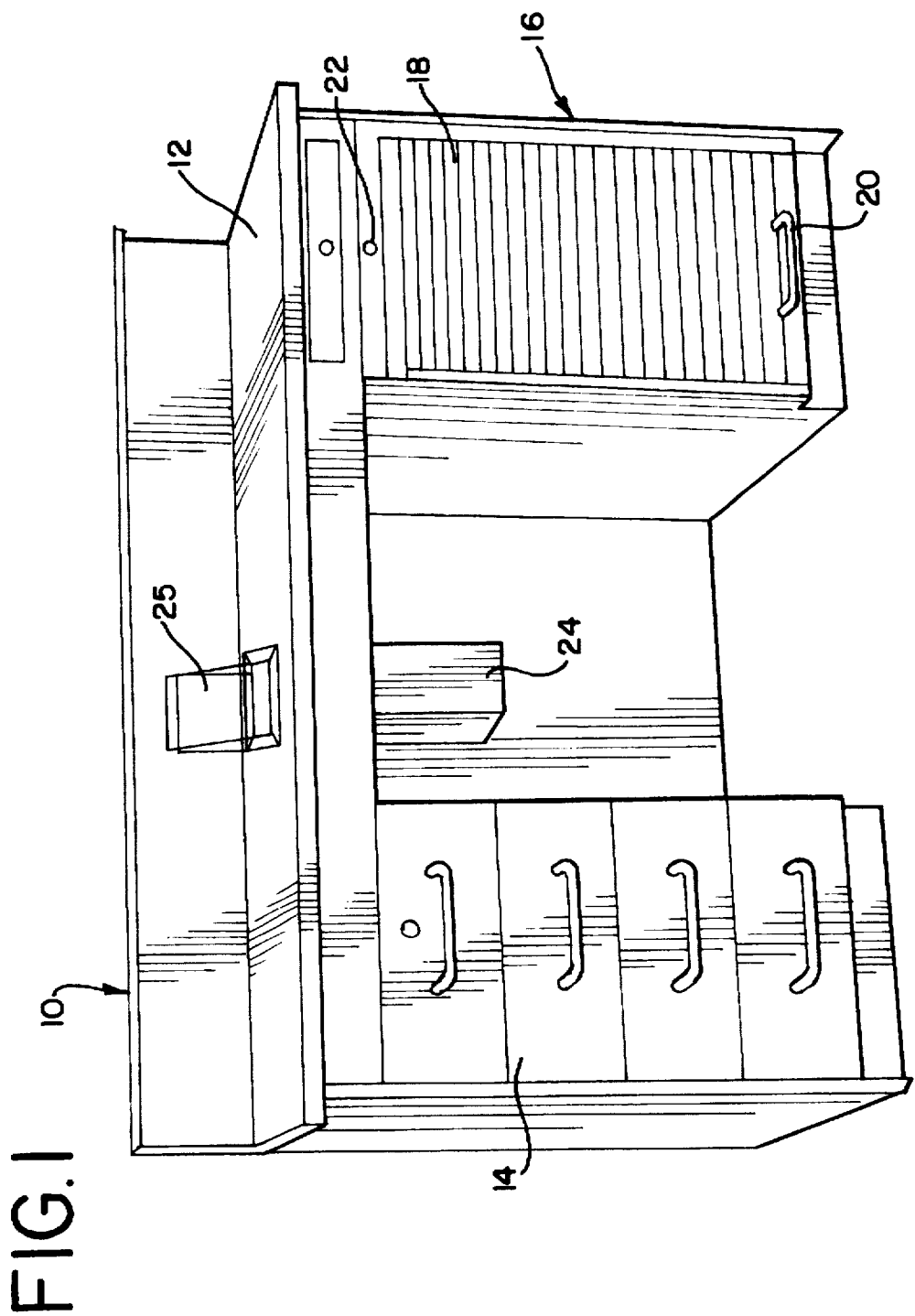
FIG. 1 is a perspective view of a clinical workstation having a lockable cabinet in which is stored the dental simulation and teaching equipment.

Turning first to FIG. 1, there is illustrated a clinical workstation 10 having a work surface 12, a plurality of drawers 14 along one side, and an enclosed cabinet or storage compartment 16 on the opposite side. The cabinet 16 is completely enclosed and has a door 18 at its front. The door can be either a tambour or slat construction as illustrated or may be a standard door or doors mounted on hinges. There is a handle 20 and cylinder lock 22 on the front of the door. The lock can be mounted on the top, bottom, or side of the cabinet body. The handle 20 provides a means to lift open and pull closed the door. The lock 22 provides a means to secure the door in its closed position prohibiting access to the interior of the cabinet 16. There may also be provided a dust collector 24 with a safety grinding hood 25 on the top work surface 12 so that the student can perform procedures such as trimming dies and the preparation of custom trays while removing any grindings or dust particles. Most of these laboratory procedures are done with laboratory handpieces which can be provided at the work surface 12. The dust collector itself can either be a remotely located system in which one motor provides suction at several workstations or a self-contained individual system in which each workstation has its own small dust collector. The dust collector is activated when the laboratory handpiece is turned on/off.

The clinical workstation 10 is preferably made of a steel housing which is reinforced to provide a rigid, warp-free structure. The steel housing is preferably pre-treated with a metallic phosphate coating and finished with multiple applications of baked, electrostatic powder. The door 18 is preferably a recessed tambour door which slides vertically to open and close. It is totally contained within the top of the storage compartment 16 when it is opened.

Figure 2:
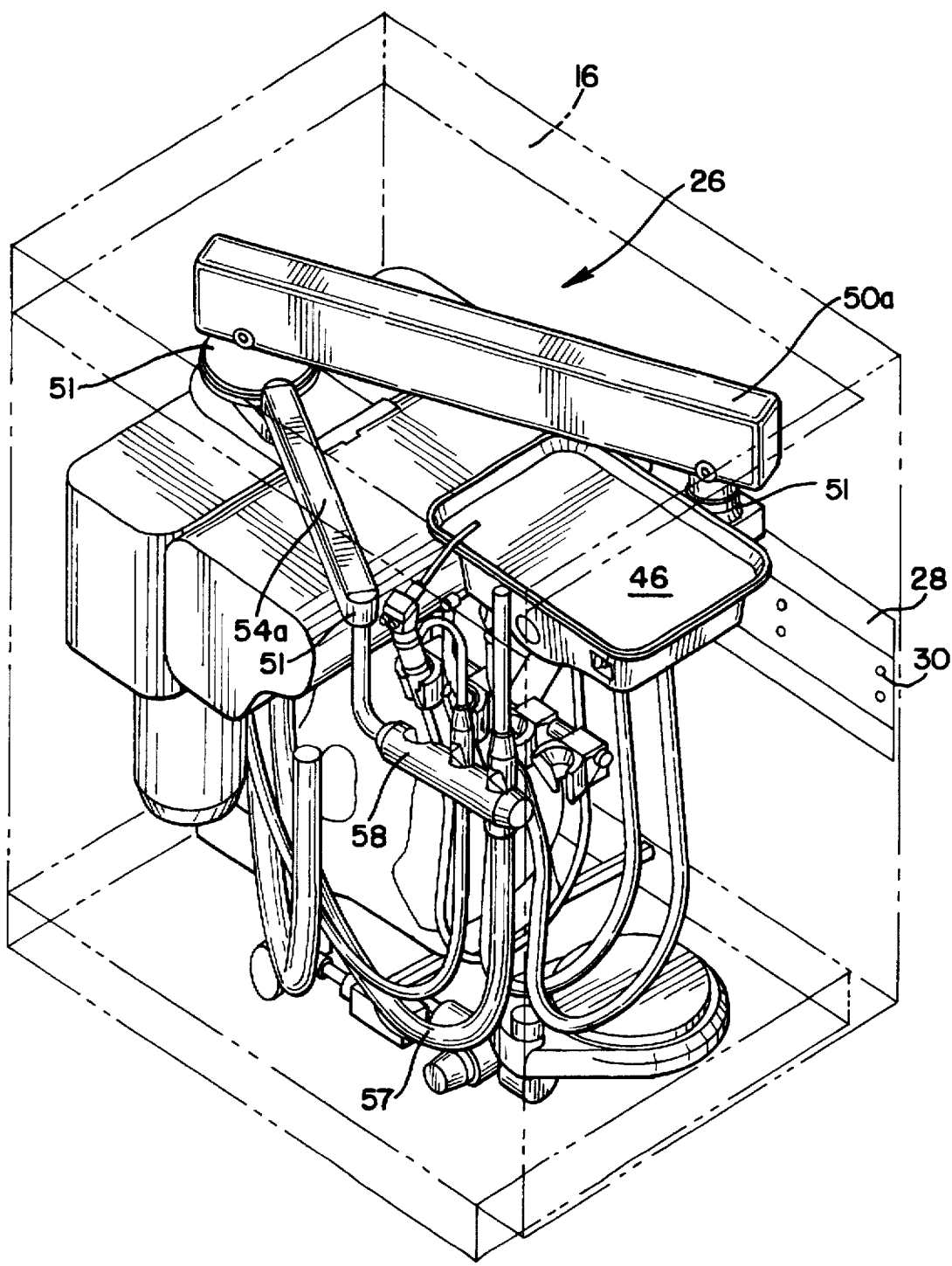
FIG. 2 is a perspective view with portions removed of the cabinet illustrating the dental simulation and teaching equipment folded and stored inside the cabinet.

In FIG. 2, the cabinet 16 is illustrated separate and apart from the workstation 10. There is a simulator 26 housed within the cabinet 16. A properly designed simulator should enable the student to place the treatment equipment in the same relative position that the patient will be in on a clinic floor.

Within each side of the cabinet 16 are mounted slide rails 28. One is positioned on one side wall of the cabinet 16, and the other is on the opposite side wall. A slide mechanism 30 slides within the slide rails 28. The simulator 26 is mounted on a mounting bracket which in turn is attached to the slide mechanism 30 which allows the simulator 26 to be slid into the cabinet 16 or pulled out through the front door 18.

Figure 3:
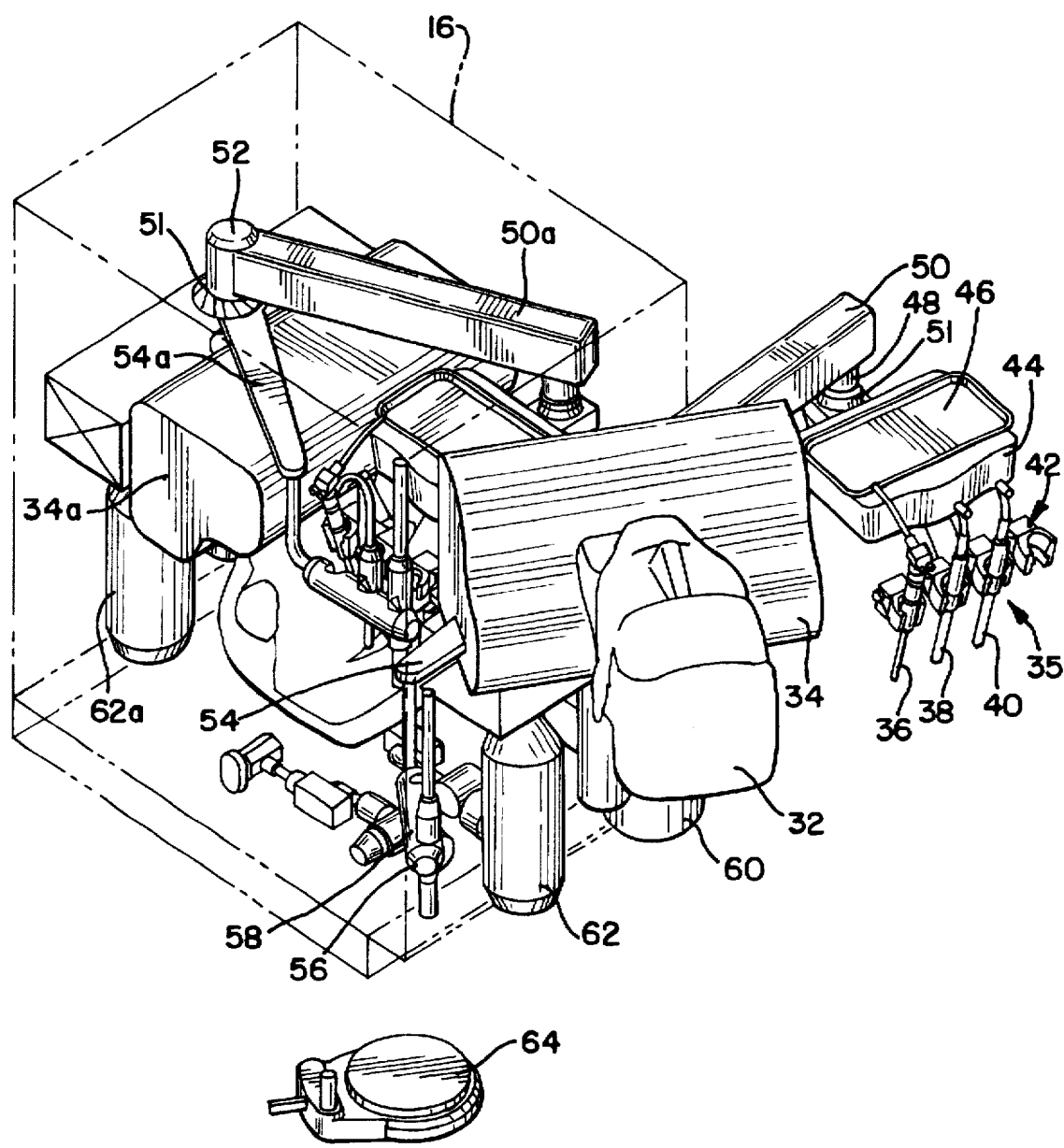
FIG. 3 is a perspective view with portions removed illustrating the dental simulation and teaching equipment in both the stored position and the extended operable position.
Figure 5:
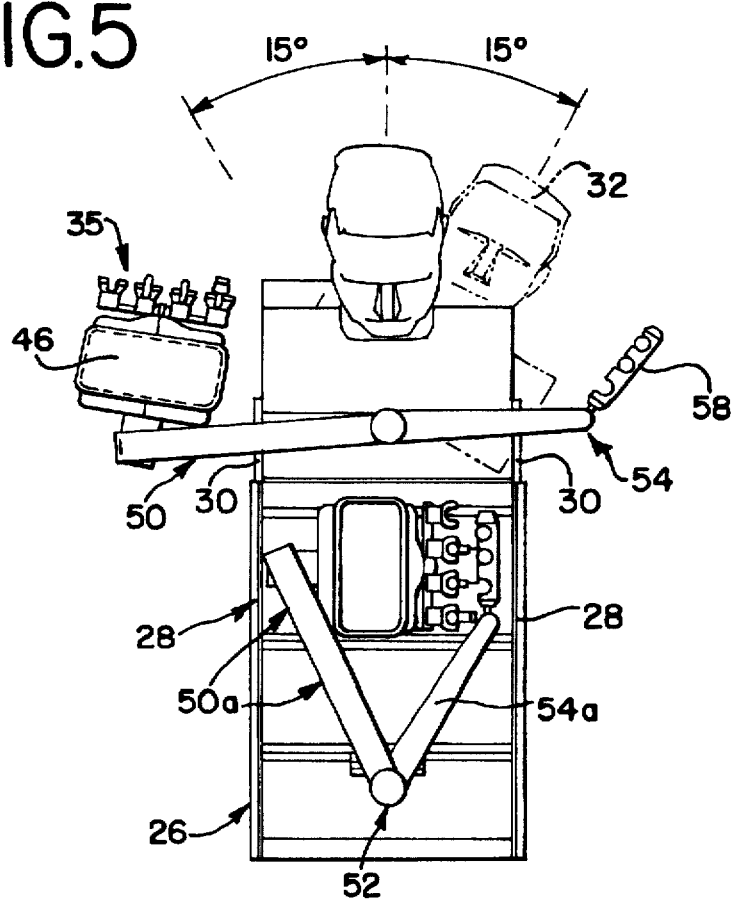
FIG. 5 is a top view of the device shown in FIG. 4 showing the dental simulation and teaching equipment in the stored position and the extended position.

The simulator 26 and its elements are more clearly illustrated in FIG. 3. The simulator is shown in both the stored position and the extended operable condition. Like numbers have been utilized to illustrate the simulator in both the stored and extended positions. The simulator basically consists of a mannequin head 32 and a torso 34. The mannequin head should be permitted to rotate about the long axis of the head to simulate the tilting of a patient's head to face the dentist. Similarly, the torso should rotate in both directions in a horizontal plane (as illustrated in FIG. 5). The head 32 contains the oral cavity. The simulator 26 should be designed to receive all major manufactured model mannequin heads so that the simulator is universally acceptable. The treatment equipment should include handpieces 35 such as a three-way air/water syringe 36 and high and low speed air-driven or electric dental handpieces 38, 40. There may also be provided a fiber optic curing light for composite resins. The handpieces 35 are mounted in a handpiece holder 42 which is affixed to a handpiece control unit 44. The handpiece control unit 44 will control the operation of the individual handpieces 35, and air and water syringe by means of valves and controls.

On top of the handpiece control unit 44 is an instrument tray 46 on which the dentist can place hand instruments, dental appliances, etc. The instrument control tray 46 is connected by a pivot mechanism 48 to one end of a handpiece control unit arm 50. The other end of the handpiece control unit arm 50 is connected to the bottom of the torso 34 at a pivotal connection 52 (FIG. 5).

Also extending from the pivotal connection 52 is a vacuum tools arm 54 which has mounted at its opposite end vacuum tools 56. These can be a high volume evacuator handpiece with a rotary control valve, a saliva ejector handpiece, and connection tubing 57. A holder 58 supports the vacuum tools 56. There is also provided either a central water system consisting of a domestic water source with plumbing routed to the simulator or a self-contained compressed air system consisting of a refillable clean water supply bottle 60 and a dirty water collector 62.

The pivot mechanism 48 which connects tray 46 and handpiece control unit arm 50 is numerically indexed with markings 51 placed circumferentially about mechanism 48. Similarly, the pivotal connection 52 which connects the control unit arm 50, vacuum tools arm 54, and torso 34 is numerically indexed. The holder 58 may also be pivotally connected to the arm 54 with similar indexing means. This permits the instructor to have the students position the mannequin torso and instruments into the appropriate relationship for various treatment procedures.

A foot control 64 is of a standard design which provides accurate handpiece speed control and includes a coolant water on/off switch. The foot control 64 is connected to the handpiece control unit 44 by means of appropriate connections.

Figure 4:
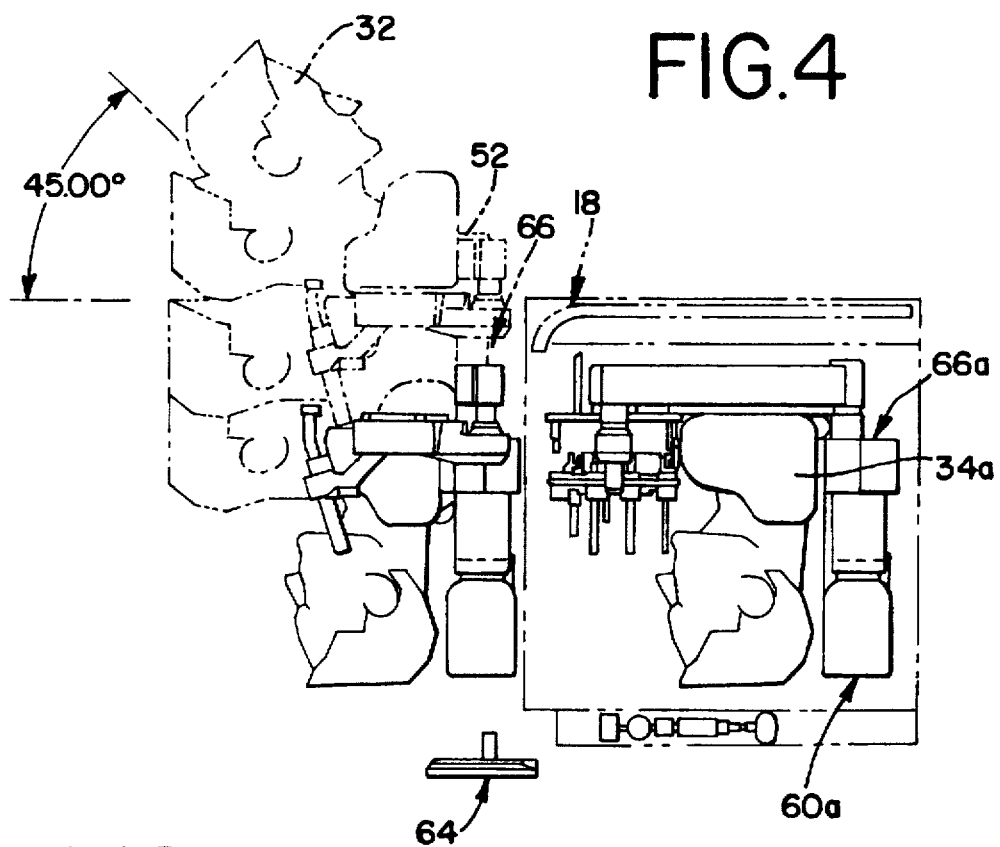
FIG. 4 is a cross-sectional view with portions removed showing the dental simulation and teaching equipment stored within the cabinet and also extended into the operable position.

The simulator 26 is illustrated in both the stored and extended positions in FIG. 3. In the stored position, it can be seen that the unit control arm 50a and vacuum tools arm 54a are pivoted and stored within the cabinet 16. Similarly, the dirty water collector 62a slides to the back of the cabinet 16. In FIG. 4, the torso 34a is rotated 90° and stored in an upside down orientation.

The storage of the simulator 26 is also illustrated in both the stored and extended positions in FIG. 4. The mannequin head 32 can be seen in several of its extended positions. It is mounted on a lifting and rotating mechanism 66 which provides a means to rotate the head and torso and raise or lower it so that it will be in a convenient position for the dentist practitioner to work in the oral cavity. When the simulator 26 is to be stored, the mannequin head 32 and torso 34 are pivoted downward 90° so that they can be stored upside down.

As seen in FIG. 4, the mannequin head 32a and torso 34a are within the cabinet 16 in its stored position. The door 18 is shown in its upright rolled up position. The door is adapted to be drawn down over the front of the compartment 16 so that it can be locked to protect the simulator 26.

As seen in FIG. 5, the torso 34 can rotate about the pivot point 52 so that both the torso and mannequin head 32 will rotate in both directions. Furthermore, the control unit arm 50 and vacuum tools arm 54 rotate 180° so that the handpiece control unit and vacuum tools can be used by either a left- or right-hand operator. Also, as seen in FIG. 5, the control unit arm 50a and vacuum tools arm 54a are illustrated in the pivoted and stored position within the cabinet 26. The slide rails and mechanism 28, 30 are shown along either side of the cabinet 26.

Thus, there has been provided a clinical simulation workstation that fully satisfies the objects, aims, and advantages set forth herein. While the invention has been described in conjunction with a specific embodiment, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A dental teaching and practicing simulator comprising:
   a stationery workbench having a work surface and a completely enclosed storage compartment, the storage compartment having an openable door, locking means on the door to restrict access to the storage compartment;
   a slide mechanism mounted inside of the storage compartment, the slide mechanism adapted for movement between inside and outside the storage compartment;
   dental simulation and teaching equipment mounted to the slide mechanism, the simulation and teaching equipment comprising a mannequin head, a torso, a handpiece control arm, a handpiece control unit pivotally attached to the handpiece control arm, handpieces operatively connected to the control unit, a vacuum tools arm, a vacuum tool support pivotally attached to the vacuum tools arm, at least one vacuum tool mounted on the vacuum tool support, and clean water supply means and dirty water removal means;
   whereby the dental simulation and teaching equipment can be stored and locked in the storage compartment and then slid out for use when the door is unlocked and opened, thus providing a safe and secure environment for the equipment until its authorized use.

2. The simulator of claim 1 wherein the openable door is of slat construction for allowing the door to be raised and stored within the storage compartment.

3. The simulator of claim 1 and further comprising torso pivotal mounting means for mounting the torso to the slide mechanism which allows the torso to pivot about a vertical axis to simulate a patient's orientation.

4. The simulator of claim 3 and further comprising mannequin head mounting means for mounting the mannequin head to the torso which allows the head to pivot about a horizontal axis to simulate the lifting of a patient's head.

5. The simulator of claim 3 and further comprising handpiece control arm mounting means and vacuum tools arm mounting means, both mounting means allowing the respective arms to rotate 180° about a vertical axis whereby the handpieces and vacuum tool can be oriented for either right hand or left hand operation.

6. The simulator of claim 5 wherein the handpiece control arm mounting means and vacuum tool arm mounting means are rotating pivot connections along a common vertical axis.

7. The simulator of claim 5 and further comprising indexing means on the control arm mounting means and torso pivotal mounting means to provide reference locations for positioning the head and handpieces with respect to each other.

8. The simulator of claim 1 and further comprising a foot control for operating the handpieces, the foot control moveable from positions between inside and outside the storage compartment.

9. The simulator of claim 1 wherein the openable door is connected along an edge by hinges allowing the door to pivot between opened and closed positions.

10. A dental teaching and practicing simulator comprising:
    an enclosed cabinet having an openable front door;
    locking means to lock the door in the closed position;
    moveable means mounted in the cabinet for providing a movement mechanism which moves from within to outside of the cabinet;
    dental simulation and teaching equipment comprising a mannequin head, a torso, a handpiece control arm, a handpiece control unit attached to the handpiece control arm, handpieces operatively connected to the control unit, a vacuum tools arm, at least one vacuum tool, clean water supply means and dirty water removal means;
    a mounting bracket attached to the moveable means, the dental simulation and teaching equipment mounted to the mounting bracket;
    whereby the dental simulation and teaching equipment can be selectively moved between inside and outside of the cabinet, and can be stored and locked within the cabinet, thus providing a safe and secure environment for the equipment until its authorized use.

11. The simulator of claim 10 wherein the moveable means is a slide mechanism mounted inside of the cabinet with the dental simulation and teaching equipment mounted on the mounting bracket which is attached to a slide rail which cooperates with the slide mechanism to allow the dental simulation and teaching equipment to be slid from inside to outside of the cabinet.

12. The simulator of claim 10 wherein the openable door is made of slats for allowing the door to be raised and stored within the cabinet.

13. The simulator of claim 10 and further comprising torso pivotal mounting means for mounting the torso to the slide mechanism which allows the torso to pivot about a vertical axis to simulate a patient's orientation.

14. The simulator of claim 13 and further comprising indexing means on the torso pivotal mounting means to provide reference locations for positioning the torso in predetermined orientations.

15. The simulator of claim 13 and further comprising mannequin head mounting means for mounting the mannequin head to the torso which allows the head to pivot about a horizontal axis to simulate the lifting of a patient's head.

16. The simulator of claim 10 and further comprising handpiece control arm mounting means and vacuum tools arm mounting means, both mounting means allowing the respective arms to rotate 180° about a vertical axis whereby the handpieces and vacuum tool can be oriented for either right hand or left hand operation.

17. The simulator of claim 16 wherein the handpiece control arm mounting means and vacuum tool arm mounting means are rotating pivot connections along a common vertical axis.

18. The simulator of claim 17 and further comprising indexing means on the rotating pivot connections to provide reference locations for positioning the handpieces and vacuum tools in predetermined orientations.

19. The simulator of claim 10 and further comprising a foot control for operating the handpieces, the foot control moveable from positions between inside and outside the storage compartment.

20. The simulator of claim 10 wherein the openable door is connected along an edge by hinges allowing the door to pivot between opened and closed positions.

* * * * *